United States Patent [19]

Ernst

[11] Patent Number: 4,567,665
[45] Date of Patent: Feb. 4, 1986

[54] POSITION SENSING APPARATUS

[75] Inventor: Alfons Ernst, Traunreut, Fed. Rep. of Germany

[73] Assignee: Dr. Johannes Heidenhain GmbH, Traunreut, Fed. Rep. of Germany

[21] Appl. No.: 666,871

[22] Filed: Oct. 31, 1984

[30] Foreign Application Priority Data

Nov. 8, 1983 [DE] Fed. Rep. of Germany ....... 3340311

[51] Int. Cl.⁴ .............................................. G01B 7/02
[52] U.S. Cl. ................ 33/169 R; 33/172 E; 33/561
[58] Field of Search ............ 33/169 R, 169 C, 172 R, 33/172 D, 172 E, 556, 558, 559, 561

[56] References Cited

U.S. PATENT DOCUMENTS 4,510,693 4/1985 Cusack ............................... 33/169 R

FOREIGN PATENT DOCUMENTS 2840934 3/1979 Sweden .

OTHER PUBLICATIONS

Messeinrichtungen zum Prufen der Werkstuckmasse an Bearbeitungszentren, by Herbert G. Babic from Maschinenmarkt, Wurzburg 88 (1982) (and translation).

Primary Examiner—Harry N. Haroian
Attorney, Agent, or Firm—Willian Brinks Olds Hofer Gilson & Lione Ltd.

[57] ABSTRACT

In a sensing or measuring arrangement for determining the position or dimensions of a test object, the sensing arrangement housing is fastened to a receiving element for the installation of the sensing housing onto a tool receptacle of a spindle of a machine tool. A voltage source is included in the sensing housing to power a measuring signal transmitting system. In addition, a switching arrangement is included for switching the voltage source from a standby mode of operation characterized by low current consumption to a measurement mode of operation in order to increase the life of the voltage source. This switching arrangement is responsive to an expansion measuring strip which detects an axial elongation of the receiving element in the tool receptacle. In the disclosed embodiment the expansion measuring strip is fastened to an inner surface of the receiving element which is subject to axial elongation when the receiving element is installed in place in the spindle of the machine tool.

11 Claims, 3 Drawing Figures

POSITION SENSING APPARATUS

BACKGROUND OF THE INVENTION

The present invention relates to a sensing and/or measuring system of the type which operates to determine the position of at least one surface of a test object and which includes a housing, a receiving element fastened to the housing for securing the housing to a tool receptacle of a spindle, a sensing pin, a voltage source in the housing, and at least one measuring system responsive to the sensing pin and powered by the voltage source.

Such devices have been used in connection with coordinate measuring machines and with numerically controlled processing machines in order to determine the position and/or the dimensions of a test object, workpiece, or tool.

In West German DE-OS No. 28 40 934 there is described a sensing arrangement which includes a housing that is fastened to a tool receptacle of the spindle of a machine tool. A sensing pin projects from the bottom of the housing, and the sensing pin defines a sensing ball. The sensing pin is movably mounted in the bottom of the housing by means of a membrane, and the sensing pin is connected within the housing to a plate. The plate is pressed by means of a spring against the bottom of the housing and the plate is engaged with four measuring value transformers which register each deflection of the sensing pin in axial as well as radial directions. The output signals generated by these measuring value transformers are applied to a signal preparation circuit which is connected with a voltage source arranged within the sensing device. The signal preparation arrangement is switched on by a switch which is operated when the sensing ball is placed on a surface of the workpiece to be tested. The output signals of the signal preparation circuit are transmitted wirelessly to an external reproducing circuit. Since for the operation of the switch a relatively great axial displacement of the sensing pin is required, measuring precision is impaired. In addition, the switching reliability of the switch is dependent upon wear and the frequency of switching.

The publication "Maschinenmarkt", Wurzburg, 88 (1982) 68 at pages 1374 and 1375 describes a three-dimensional measuring sensor with a built-in voltage source in the form of an accumulator for optical signal transmission. It is only with the installation of the measuring sensor into the tool receptacle of the spindle of a machine tool that the accumulator is switched over from a standby mode with low current comsumption into a measuring mode. This is done in order to lengthen the life of the accumulator in response to an optical switch-on signal supplied by the machine tool. This optical arrangement for the switching on of the measuring sensor, because of the necessary components, is a relatively expensive approach. Furthermore, because the transmitter or the receiver may be optically blocked by contamination, and because foreign objects may inadvertently block in the beam path, this system is not foolproof. In addition, there is the possibility of a reciprocal interference with the machine with which the measuring sensor is used.

SUMMARY OF THE INVENTION

The present invention is directed to an improved sensing or measuring arrangement of the general type described above which includes a particularly simple system for reliably switching the voltage supply from a standby mode of operation to a measuring mode of operation, which is to a large extent free of interference and which does not interfere with measuring accuracy.

According to this invention, a sensing apparatus of the type described initially above is provided with a sensor which is responsive to axial elongation of the receiving element and is operative to detect mounting of the receiving element in the tool receptacle. Switching means are provided which are responsive to the sensor for switching the voltage source into a standby mode when the sensor indicates that the receiving means is not mounted in the tool receptacle, and for switching the voltage source into a measuring mode when the sensor indicates that the receiving element is mounted in the tool receptacle.

The present invention provides important advantages in that it relies on the detection of a longitudinal expansion of the receiving element in the tool receptacle in order to provide a particularly simple and economical arrangement for switching the voltage supply from the standby mode of operation to the measuring mode of operation. The disclosed system is largely immune to external interference influences, and it is typically not subject to wear and has no disadvantageous effect on measuring accuracy. The disclosed arrangement provides a substantially improved drop-out security which ensures a maximal life of the voltage supply in the sensing or measuring arrangement. This can be particularly important in automatic production facilities, for costly down time and maintenance time can be substantially reduced. Further advantageous features are set forth in the dependent claims.

The invention itself, together with further objects and attendent advantages, will best be understood by reference to the following detailed description, taken in conjunction with the accompanying drawings.

DETAILED DESCRIPTION OF THE PRESENTLY PREFERRED EMBODIMENTS

Figure 1:
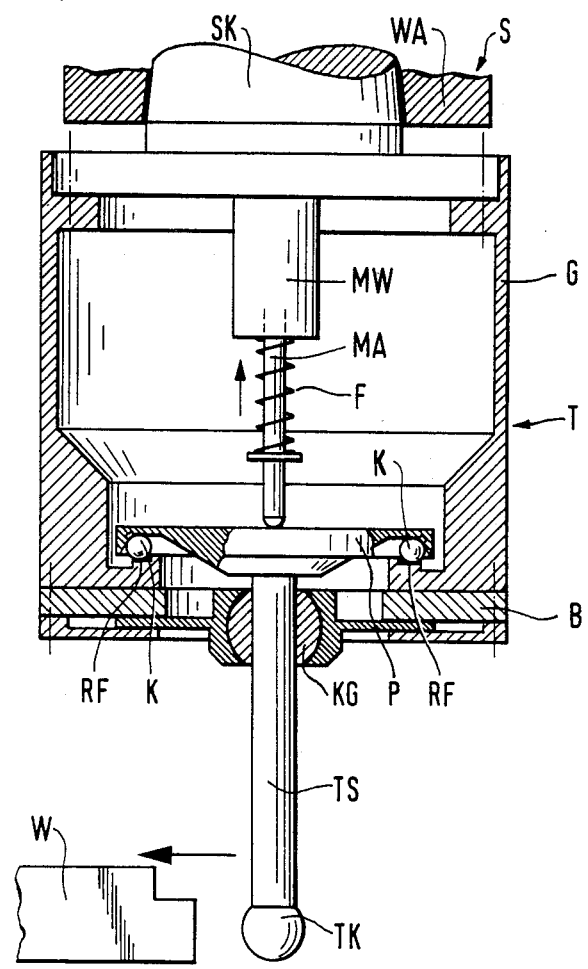
FIG. 1 is a cross-sectional view of a sensing system with a receiving element which incorporates a presently preferred embodiment of this invention.

Turning now to the drawings, FIG. 1 represents a cross-sectional view of a sensing system T which incorporates a presently preferred embodiment of this invention. This sensing system T includes a housing G which is fastened by means of a receiving element which takes the form of a tensioning cone SK in a tool receptacle WA of a spindle S of a machine tool (not shown). Such tool receptacles WA are well-known to those skilled in the art, and they are typically used to fasten various tools to the spindle S. These tools are selected in a manner not shown from a tool magazine by means of known automatic tool changing systems as required for differing processing operations. After conclusion of a processing step, or at a suitable intermediate stage of a processing step, the sensing system T is installed from the magazine into the tool receptacle WA by the tool changing system.

The housing G of the sensing system T includes a bottom plate B which in turn includes a ball joint KG. A sensing pin TS which includes a sensing ball TK projects from the ball joint KG for the sensing of a workpiece W to be tested. The other end of the sensing pin TS is fastened in the interior of the housing G to a plate P. This plate P rests at its periphery on several equidistantly distributed balls K. These balls K can be fastened for example by means of a suitable cement to an annular surface RF defined by the housing G adjacent to the bottom plate B. A measuring value transformer MW is mounted within the housing G, and the measuring value transformer MW includes a measuring value receiver MA which is axially movable in the direction of the arrow of FIG. 1 and is positioned to rest on the center of the plate P. The spring F biases the measuring value receiver MA towards the plate P. When the sensing ball TK is brought into contact with the workpiece W, the sensing pin TS is deflected in a radial direction. This causes the plate P to experience a tilting movement as it rotates over one or two of the balls K. This tilting movement causes the measuring value receiver MA engaged with the center of the plate P to move axially and to act upon the measuring value transformer MW. Depending upon the particular application, the measuring value transformer MW may give off a digital signal which is indicative of contact between the sensing ball TK and the workpiece W, or alternately the measuring value transformer MW may generate a measuring signal which is proportional to the deflection of the sensing ball TK. After the sensing operation has been completed, the sensing ball TK returns to a zero position which is reliably and reproduceably defined by the balls K, the plate P, and the biasing force of the spring F. The ball joint KG permits both arbitrary radial deflections of the sensing ball TK and also an axial displacement of the sensing pin TS.

Figure 2:
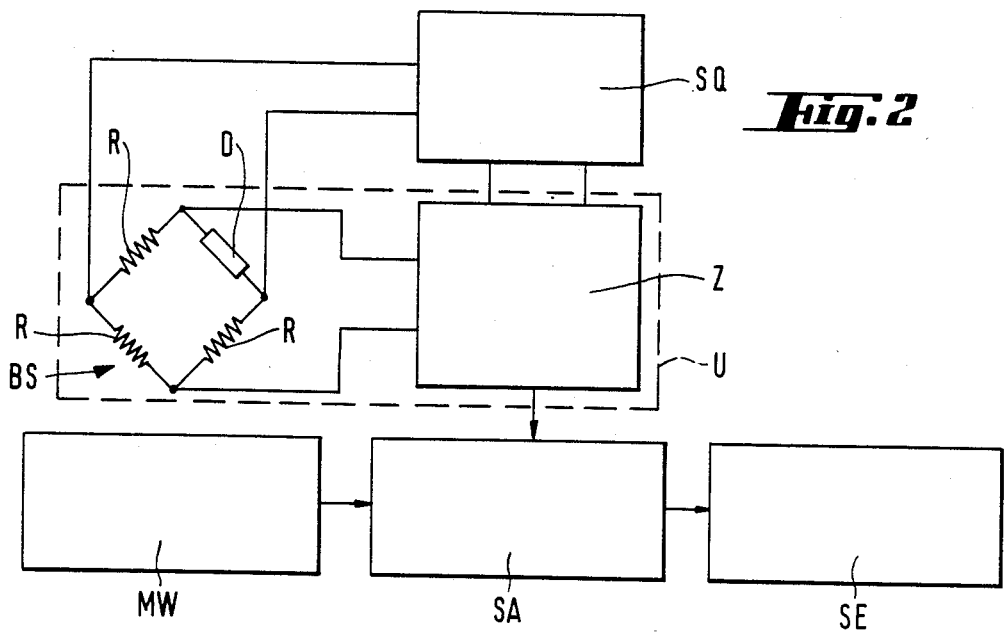
FIG. 2 is an electrical circuit diagram of portions of the embodiment of FIG. 1.

As shown in FIG. 2, the switching signal or the measuring signal generated by the measuring value transformer MW is applied to a signal preparation circuit SA which is connected to a voltage source SQ mounted within the sensing system T.

The output signals of the signal preparation circuit SA are transmitted, for example wirelessly, by means of a transmitter unit SE and an external receiver unit (not shown) to the machine tool control.

The voltage source SQ may take the form, for example, of a direct voltage battery having only a limited life. In order to extend the life of the voltage source SQ for as long as possible, care should be taken that the voltage source SQ is switched on only in the actual measuring operation during its use on the machine tool. During the remainder of the time when the measuring system T is in a tool magazine, for example, it is preferable to have the voltage source SQ in a standby mode of operation in which current consumption is low.

In order to accomplish this result, a switching arrangement U is included in the sensing system T for switching the voltage source SQ from a standby mode of operation into a measuring mode of operation. According to this invention, the switching arrangement U is acted upon by at least one sensor D which is responsive to axial expansion of the receiving element SK when installed in the tool receptacle WA.

As shown in FIG. 2, in this embodiment the switching arrangement U includes a bridge circuit BS and a switching amplifier Z. The voltage source SQ is connected via the switching amplifier Z to the signal preparation circuit SA. In addition, the voltage supplied by the voltage source SQ is applied to a diagonal of the bridge circuit BS. The output lines of the other diagonal of the bridge circuit BS control the switching amplifier Z. In the branches of the bridge circuit BS there are arranged three resistors R and the sensor D which in this embodiment takes the form of an expansion measuring strip, the resistance of which varies as a function of the axial expansion of the tensioning cone SK. When the resistance of the expansion measuring strip D changes as a result of an axial expansion of the receiving element SK, the voltage source SQ is switched by the switching amplifier Z into a measuring mode of operation in which an operating voltage is applied to the signal preparation circuit SA during the measuring operation.

After the receiving element SK has been removed from the tool receptacle WA, the axial expansion of the receiving element WK is suspended and the switching amplifier Z is no longer driven by the bridge circuit BS. For this reason, the switching amplifier Z automatically switches the voltage source SQ from the measuring mode of operation back to the standby mode of operation, thereby returning the voltage source SQ to a state of low current consumption.

Figure 3:
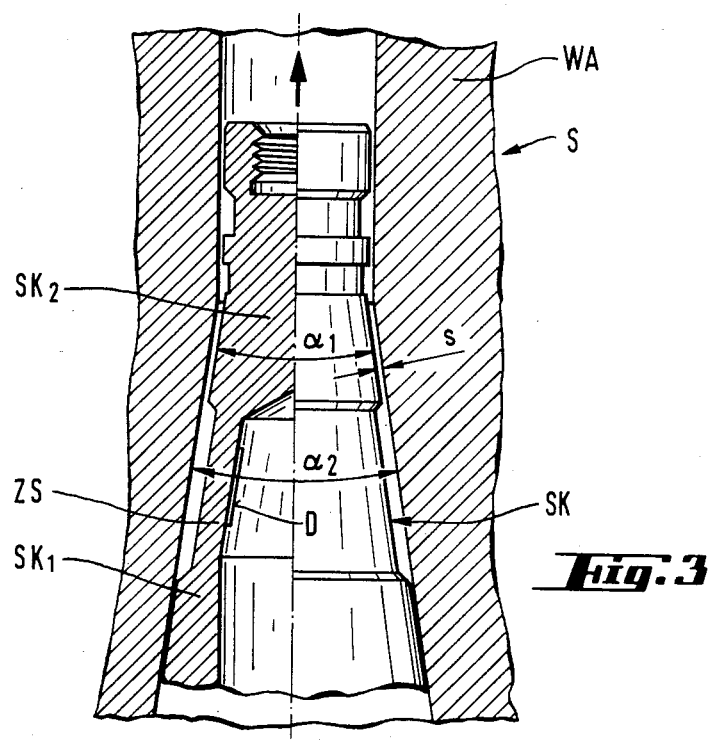
FIG. 3 is a partial sectional view of the receiving element of the embodiment of FIG. 1 mounted in the tool receptacle of the spindle.

FIG. 3 represents a cross-sectional view showing further details of the receiving element SK of the sensing system T. In this embodiment, the receiving element SK takes the form of a tensioning cone and the tool receptacle WA takes the form of a conical recess in the spindle S of the machine tool. FIG. 2 represents a partial sectional view of an upper portion of the embodiment of FIG. 1. During installation, the tensioning cone SK is drawn by means of a tensioning force acting in the direction of the arrow of FIG. 3 into the conical recess of the tool receptacle WA. The tensioning cone SK is constructed in such a way that at least in a partial zone it undergoes an axial elongation upon insertion into the tool receptacle WA.

In this embodiment, this axial elongation is a result of the fact that the outer cone angle $\alpha_1$ of the tensioning cone SK is slightly greater than the inner cone angle $\alpha_2$ of the conical recess WA. For this reason, when the tensioning cone SK is inserted into the conical recess WA, first the lower cone zone (base zone of the tensioning cone SK) comes into contact with the wall of the conical recess WA, while the upper cone zone presents a radial spacing S from the wall of the hollow cone WA. When a predetermined tensioning force is applied to the tensioning cone SK in the direction of the arrow of FIG. 3, the upper cone zone of the tensioning cone SK also comes into contact with the wall of the conical recess WA, so that the tensioning cone SK undergoes a predetermined axial elongation.

The tensioning cone SK can also be made up of a lower partial cone $SK_1$ and an upper partial cone $SK_2$ as shown in FIG. 3. In FIG. 3, the upper and lower partial cones $SK_1$, $SK_2$ are connected to one another by means of an intermediate piece ZS which defines a predetermined region of axial expansibility or elasticity. In this preferred embodiment, the intermediate piece ZS and the two partial cones $SK_1$, $SK_2$ are constructed in one piece of the same material. The defined axial expansibility is achieved by a predetermined cross-section reduction of the intermediate piece ZS. In this embodiment the expansion measuring strip D is fastened to an inner surface of the tensioning cone SK which is subject to axial expansion when installed in the spindle of the machine tool.

Of course, it should be understood that a wide range of changes and modifications can be made to the preferred embodiment described above. For example, the sensor D can also be formed by a piezoelectric element, by an inductive element, or by a capacitive element. It is therefore intended that the foregoing detailed description be regarded as illustrative rather than limiting, and that it be understood that it is the following claims, including all equivalents, which are intended to define the scope of this invention.

I claim:

1. In an apparatus for determining the position of at least one surface of a test object, of the type comprising a housing; a receiving element fastened to the housing for securing the housing to a tool receptacle of a spindle; a sensing pin; a voltage source in the housing; and at least one measuring system responsive to the sensing pin and powered by the voltage source, the improvement comprising:

at least a sensor responsive to axial elongation of the receiving element and operative to detect mounting of the receiving element in the tool receptacle; and switching means, responsive to the sensor, for switching the voltage source into a standby mode when the sensor indicates that the receiving element is not mounted in the tool receptacle, and for switching the voltage source into a measuring mode when the sensor indicates that the receiving element is mounted in the tool receptacle.

2. The invention of claim 1 wherein the sensor comprises an expansion measuring strip fastened to an inner surface of the receiving element subject to axial elongation when the receiving element is mounted in the tool receptacle.

3. The invention of claim 1 wherein the receiving element comprises a tensioning cone, wherein the tool receptacle comprises a conical recess, and wherein the receiving element is subjected to a tensioning force when mounted in the tool receptacle.

4. The invention of claim 3 wherein the tensioning cone defines an included angle $\alpha_1$, wherein the concial recess defines an included angle $\alpha_2$, and wherein $\alpha_1$ is slightly greater than $\alpha_2$ in order to generate axial tensioning forces on the receiving element.

5. The invention of claim 3 wherein the tensioning cone comprises first and second partial cones connected with one another via an intermediate element which defines a zone of axial expandability.

6. The invention of claim 5 wherein the partial cones and the intermediate element are integrally formed of one piece of a single selected material.

7. The invention of claim 1 wherein the switching means comprises:

a bridge circuit coupled to the voltage source; and a switching amplifier responsive to the bridge circuit and interposed between the voltage source and the measuring system to vary the voltage applied to the measuring system.

8. The invention of claim 7 wherein the sensor is included in a branch of the bridge circuit.

9. The invention of claim 1 wherein the sensor comprises a piezoelectric element.

10. The invention of claim 1 wherein the sensor comprises an inductive element.

11. The invention of claim 1 wherein the sensor comprises a capacitive element.

* * * * *